United States Patent [19]

Ross et al.

[11] Patent Number: 5,108,614

[45] Date of Patent: Apr. 28, 1992

[54] DEVICE AND A METHOD FOR FILTERING A LIQUID WITH WOOD ASH TO REMOVE IMPURITIES THEREFROM

[75] Inventors: Arnold Ross, L'Assomption; Jean Shoiry; Subba Narasiah, both of Sherbrooke, all of Canada

[73] Assignee: Serrener Consultation Inc., Sherbrooke, Canada

[21] Appl. No.: 350,018

[22] Filed: May 10, 1989

[51] Int. Cl.$^5$ .............................. C02F 1/28
[52] U.S. Cl. .................................. 210/665; 210/669; 210/688; 210/691; 210/715; 210/724; 210/807; 210/283; 210/912; 210/913
[58] Field of Search .............. 210/688, 691, 694, 743, 210/792-794, 807, 264, 283, 284, 289, 669, 912-914, 665, 702, 715, 724

[56] References Cited

U.S. PATENT DOCUMENTS

| | | |
|---|---|---|
| 5,013 | 2/1828 | Hall . |
| 89,353 | 4/1869 | Sinclaire . |
| 521,650 | 6/1894 | Häfner . |
| 560,261 | 5/1986 | Durant . |
| 600,451 | 3/1898 | Roads . |
| 847,518 | 3/1907 | Shiltz . |
| 869,188 | 10/1907 | Lukens . |
| 956,832 | 5/1910 | Seitz . |
| 1,629,085 | 5/1927 | Robertson ................. 210/290 |
| 2,302,450 | 11/1942 | Laughlin .................... 210/290 |
| 2,328,381 | 8/1943 | Jaffe . |
| 3,152,985 | 10/1964 | Stoertz et al. ............. 210/694 |
| 3,544,457 | 12/1970 | Tulley et al. .............. 210/290 |
| 3,717,251 | 2/1973 | Hampton .................... 210/807 |
| 3,790,370 | 2/1974 | Lalancette ................. 210/912 |
| 4,341,636 | 7/1982 | Harder et al. ............. 210/670 |
| 4,382,863 | 5/1983 | Riise ........................ 210/792 |
| 4,752,402 | 6/1988 | Gray ........................ 210/747 |

FOREIGN PATENT DOCUMENTS

| | | |
|---|---|---|
| 0161912 | 11/1985 | European Pat. Off. . |
| 1815136 | 7/1970 | Fed. Rep. of Germany . |
| 50-47446 | 4/1975 | Japan . |
| 55-165113 | 12/1980 | Japan . |
| 60-244310 | 12/1985 | Japan . |
| 521903 | 9/1976 | U.S.S.R. . |
| 15132 | 9/1895 | United Kingdom . |
| 154782 | 12/1920 | United Kingdom . |
| 751378 | 6/1956 | United Kingdom . |
| 1110559 | 4/1968 | United Kingdom . |
| 1164416 | 9/1969 | United Kingdom . |

OTHER PUBLICATIONS

*Use of Peat for On-Site Wastewater Treatment: I. Laboratory Evaluation;* C. A. Rock, J. L. Brooks, S. A. Bradeen, and R. A. Struchtemeyer, p. 518, J. Environ. Qual., vol. 13, No. 4, 1984.

Use of Peat for On-Site Wastewater Treatment: II Field Studies, Brooks et al., p. 524, J. Environ. Qual., vol. 13, No. 4, 1984.

Meunier, F., 1985, Utilisation de la tourbe pour le traitement des eaux usées. John Meunier Inc., Dept. Recherche et Dev., Mtl.

J. Environ. Qual., vol. 11, No. 1, 1982; D. S. Nichols et al.

*Primary Examiner*—Peter Hruskoci
*Attorney, Agent, or Firm*—Oblon, Spivak, McClelland, Maier & Neustadt

[57] ABSTRACT

The liquid from which impurities are to be removed is introduced by being distributed throughout the entire top or bottom surface of the filtering medium. The filtering medium includes at least a bed of wood ash through which the liquid is allowed to flow for removing at least part of its impurities to give a purified liquid. The liquid can flow through the filtering medium either by gravity, under pressure or can be forced upwardly through the filtering medium. This type of filtering medium has proved to be cheaper to build and used and is more efficient than those presently known.

11 Claims, 2 Drawing Sheets

FIG. 1

DEVICE AND A METHOD FOR FILTERING A LIQUID WITH WOOD ASH TO REMOVE IMPURITIES THEREFROM

BACKGROUND OF INVENTION a) Field of the Invention

This invention relates to a device and a method for filtering a liquid to remove impurities therefrom. More particularly, the present invention is involved with solving the problem resulting from the evacuation of various polluting agents in the environment and is especially concerned with the treatment of industrial waste water, leaching water from sanitary refuse, drained water from mining residues, septic tank sludge, and water resulting from the melting of snow.

b) Description of Prior Art

The polluting agents which are mostly found in the above-mentioned effluents include materials in suspension, metals, oils and greases, organic compounds and the like. The pH of these effluents varies from acid to slightly basic.

The filtration processes which are presently available generally use only one filtrating medium may rely on peat, activated carbon, sand or gravel.

The purifying property of peat has been known for a long time. The prior art (Meunier, F. 1985, *Utilisation de la tourbe pour le traitement des eux usees*. John Meunier Inc., Dept. Recherche et Dev., Montreéal; Nichols and Boelter, *Treatment of Secondary Sewage Effluent with a Peat-Sand Filter Bed*, J. Environ. Qual., Vol. 11, no. 1, 1982; Rock et al., *Use of Peat For On-Site Wastewater Treatment*: I. Laboratory evaluations. J. Environ. qual. 13: 518-523, 1984; Brooks et al. *Use of Peat for On-Site Wastewater Treatment: II. Field Studies*, J. Environ. Qual., Vol. 13, no. 4, 1984) describes applications for the treatment of waste water, effluents from septic tanks or leaching water, where filtration with peat enables to remove solids, metals and organic materials.

Filtering with activated carbon makes use of adsorption phenomenons because of its very high specific surface (1000 to 1500 m$^2$/g). Activation of carbon produces a porous structure with an increased specific surface. However, the production of activated carbon is costly because it is high energy consuming with the result that filtration of highly contaminated water with activated carbon is only carried out under exceptional circumstances.

On the other hand filtration with a bed of sand is mostly used in plants for the production of drinking water.

To applicant's knowledge, there is no teaching in the prior art of an effective treatment to remove substantially all the above undesirable polluting agents from waste water.

The following references are however of interest:

UNITED STATES PATENTS:
5,013
89,353
521,650
560,261
600,451
847,518
869,188
956,832
2,328,381

BRITISH PATENTS:
15,132
154,782
751,378
1,110,559
1,164,416

U.S.S.R. PATENT:
521,903

JAPANESE PATENTS
50-47447
51-65113
244310

GERMAN PATENT
1,815,136

EUROPEAN PATENT
161,912

It is therefore an object of the present invention to provide a solution to the evacuation of various polluting agents in the environment.

Is is another object of the present invention to provide a device and a method of filtering a liquid to remove impurities therefrom which is highly efficient, is simple to operate and is not too costly.

It is another object of the present invention to provide a device and a method of filtering which is based on a new combination of filtrating media whereby the efficiency results from the synergism of certain filtrating media, which are used separately in conventional filtration processes.

It is another object of the present invention to provide filtration media incorporating a new medium which achieves more satisfactory results and enables to reach a higher degree of purification, while greatly increasing the treatment yield.

SUMMARY OF INVENTION

According to the invention, there is provided a device for filtering a liquid to remove impurities therefrom. . The device has means to introduce the liquid therein, means defining a filtering medium and means to remove filtered liquid therefrom. The filtering medium comprises a bed of wood ash through which the liquid can be allowed to flow so as to remove at least part of the impurities to give a purified liquid. The wood ash is preferably derived from thermoelectrical plants for burning wood and residues thereof. Also any other kind of wood ash may also be used within the scope and spirit of the present invention.

Preferably, the filtering medium comprises a plurality of superposed beds of filtering materials, the bed of wood ash constituting one bed of filtering material. For example, the filtering medium may comprise at least one upper bed, at least one lower bed, and an intermediate bed consisting of the bed of wood ash.

In accordance with a preferred embodiment of the present invention, a bed of peat is located above the bed of wood ash and a bed of gravel is located above the bed of peat; a bed of sand is located below the bed of wood ash and a bed of gravel is located below the bed of sand.

In accordance with another preferred embodiment according to the invention, a bed of gravel is located above the bed of wood ash, a bed of sand is located below the bed of wood ash and a bed of gravel is located below the bed of sand.

The device according to the present invention may comprise membrane means disposed between neighboring beds, so as to prevent mixing of the materials from the neighboring beds and to keep each bed in allocated place, while allowing the liquid to flow therethrough and through the beds.

The membrane means preferably consists of a non-woven material made of synthetic fibres, for example the membrane may consist of Geotextiles ™.

Although the thicknesses of the various beds of filtering material are not all critical, since they depend on the degree and nature of the liquid to be filtered. The bed of wood ash generally has a thickness up to about three times the thickness of any other bed.

The means used to introduce the liquid in the device preferably comprise a system for distributing the liquid at the top of the uppermost bed substantially throughout the entire surface thereof, while allowing the liquid to flow by gravity through the entire filtering medium. Of course, the liquid may also be caused to flow under pressure through the entire filtering medium if this proves to be necessary.

Under certain circumstances, it may be desirable to introduce the liquid under pressure at the bottom of the lowermost bed and to force the liquid to flow upwardly through the entire filtering medium.

The present invention also relates to a method of filtering a liquid to remove impurities therefrom. The method according to the present invention comprises providing a filtering medium comprising a bed of wood ash, whose thickness is sufficient to remove most of the undesirable impurities from the liquid. Then, the liquid is caused to flow through the filtering medium, and there is recovered a filtered liquid which is substantially free from the impurities. Filtration is stopped when the pH of the filtered liquid is indicative of exhaustion of the bed of wood ash, preferably at pH of about 8.5.

The method according to the invention is particularly effective when filtering industrial waste water, leaching water from sanitary refuse, drained water from mining residues, septic tank sludge, water resulting from melting snow and the like.

The method according to the present invention is particularly useful when the filtering medium consists of arrangements of beds of filtering material as described above. The liquid to be filtered is normally distributed at the top of the uppermost bed throughout its entire surface area and is allowed to flow under gravity or under pressure if this proves to be more desirable. The liquid can also be introduced at the bottom of the lowermost bed and forced to flow upwardly under pressure as is well known to those skilled in the art.

BRIEF DESCRIPTION OF DRAWINGS

The invention will now be better described and illustrated by means of Examples which should be read in conjunction with the annexed drawings in which.

DESCRIPTION OF PREFERRED EMBODIMENTS

Figure 1:
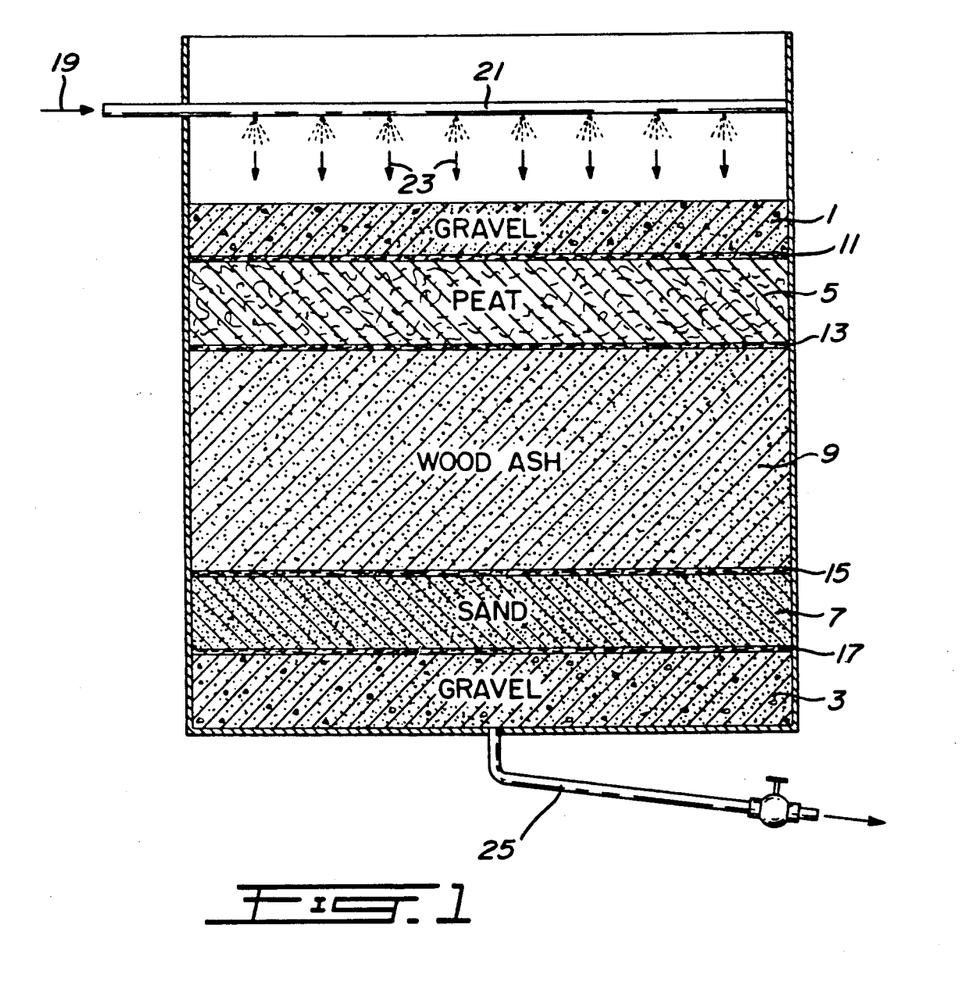
FIG. 1 is a diagram of a filtering device according to the invention incorporating wood ash.

The filtration system according to the present invention is based on the use of wood ash, preferably in combination with a plurality of filtrating layers, as shown in FIG. 1. Generally speaking, the device illustrated comprises five (5) layers of filtering materials. Uppermost layer 1 and lowermost layer 3 consist of gravel. The bed 5 below layer 1 comprises peat. The bed 7 located above layer 3 comprises sand. Sandwiched between beds 5 and 7, i.e. between the upper layer of peat and the lower layer of sand there is a substantial bed 9 of wood ash. The various beds 1, 3, 5, 7 and 9 are separated from one another by means of a non-woven membrane of Geotextiles ™. Therefore, the membrane 11 will appear between layer 1 and bed 5, a similar membrane 13 is disposed between bed 5 and bed 9, another membrane 15 appears between bed 9 and bed 7 and finally, between layer 3 and bed 7, there is still another membrane 17. The liquid to be filtered is supplied to the filtering device according to the invention as an effluent 19 which is allowed to penetrate into a duct 21 which is provided with distributing nozzles 23 so as to enable the affluent liquid to be purified to be evenly distributed throughout the entire top surface of the filtering device, i.e. at the top of layer 1. At the bottom of the filtering device, there is a duct 25 which is used to collect the purified liquid.

It will be realised that sand, peat and wood ash constitute the main filtering media. Gravel, on the other hand, constitutes a surface protection, a support and a porous medium to ensure the final flow of purified liquid. Finally, the membranes of Geotextiles which are disposed between the various layers of beds permit to maintain the latter in place and to prevent them from being mixed with one another.

The thickness of the filtering media can vary as a function of the quality of the water or products to be treated. Normally, when the filtering device includes a plurality of filtering beds, the thickness of the bed of wood ash can vary up to about 3 times the thickness of the remaining beds although this is no way critical. Anyone skilled in the art, will realise that the thickness will increase with the amount of liquid to be treated and its state of impurity. It is even possible that certain water would not require the use of peat, in which case, the filtering device would mainly consist of wood ash, sand and gravel, if necessary.

Figure 2:
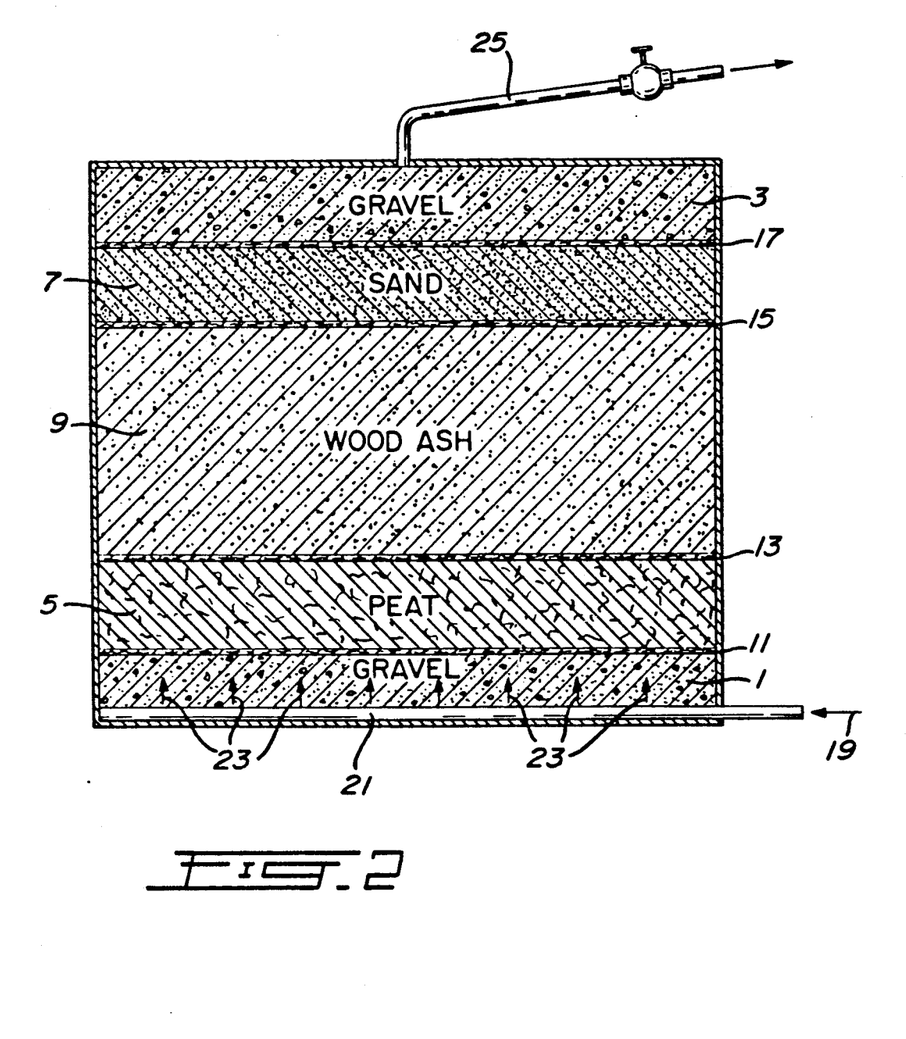
FIG. 2 is a view similar to FIG. 1 except that the liquid to be filtered is introduced at the bottom.

Whenever peat is used, it should always be upstream of the bed of wood ash. For example, by proceeding according to the diagram illustrated in FIG. 1 of the drawings, peat should always be located above the bed of wood ash. If one elects to force the liquid upwardly to the various layers, as shown in FIG. 2, the order between peat and sand would be reversed.

The prior art describes peat as an organic deposit formed of dead and partially decomposed vegetable material. Peat is composed of a plurality of organic material such as wax, ashes, bithumes, holocellulose (cellulose and hemicellulose), humic materials, (humic and fulvic acids and hymatomelanies) and lignins whose compositions depend on the original plants and the degree of decomposition. The purifying capacity of peat and similar materials has been known for a long time. The capacity of peat to remove polluting substance is mainly due to its properties: cellular structure, high specific area, porosity and ion exchange capacity. Purification with peat will therefore be the result of ionic exchange, metal complexing, adsorption and filtration of particular materials.

Peat is known to remove solid materials, oils and greases, and metals.

However, because of the washing out of humic and fulvic acids, peat has a tendency to decrease the pH and increase the concentration of biological oxygen demand (BOD) and chemical oxygen demand (COD) and to color the effluent.

According to the invention, wood ash has proved to solve many of the problems associated with previously known filtering media. Although any type of ashes produced by the combustion of wood can be used, it has been found that the preferred source of wood ash originates from plants where thermoelectric combustion of wood and residues of wood is carried out. Although it is not intended to be restricted to a particular mechanism involved in the filtration of liquids containing impurities, it is believed that the filtration mechanism with wood ash is based on chemical adsorption, chemical precipitation, absorption and filtration of particular materials. It has been found that the removal of organic substances, metals, materials in suspension and color of the filtrated liquid can be achieved with very interesting yields. In addition, it has been found that wood ash results in a complete bacteriological stabilisation of the liquid under treatment and consequently a decrease of the bad odors present in water.

Filtration on wood ash enables to overcome the disadvantages of filtrating only with peat. In addition to the removal of particles in suspension, oils and greases, wood ash is sufficient to hold the micro polluting agents, such as phenol. In addition, wood ash also enables to filter metals whose pH of precipitation is between about 10 and 12. It should be noted that the pH of the purified liquid after passage through a layer of wood ash would normally constitute a disadvantage. This however can easily be remedied by aerating the final product which brings back the pH to about 7.

As is well known to those skilled in the art, the layer of sand holds solids in suspension such as particles of precipitated metallic hydroxide. Even though most of those particles will be caught by the bed of wood ash, the bed of sand will stop those which could have escaped through the bed of wood ash. Also, sand constitutes a porous medium which, along with the bed of gravel contributes to produce a better flow of liquid and prevents the filtering device from plugging at the outlet.

As mentioned above, the filtering device according to the invention can be used under normal pressure, by gravity. The liquid can also be allowed to flow through the filtering device under pressure. In addition, the liquid to be filtered can also be forced upwardly under pressure through the filtering device, as illustrated in FIG. 2.

If pressure is used, the amount is determined as a function of the quantity of material to be treated and the possibility of plugging the filtrating device.

The life of the filtrating device according to the invention depends on the amount of polluting agents in the water to be treated and on the volume to be treated.

The process according to the present invention has been used for the treatment of various types of effluents or refuse during laboratory or field tests. The results will appear in the following examples:

EXAMPLE 1

Synthetic waste water

The waste water used contain impurities as defined in Table 1.

Two types of columns were used, column BR1 is a column exactly as shown in FIG. 1 while column BR2 is the same column which has been flushed with acid. The results are given in Table 1.

TABLE 1

FILTRATION ON COLUMN ILLUSTRATED IN FIG. 1 SYNTHETIC WATER

|  | Initial Concentration (ppm) | BR1 removed | % removed | BR2 removed | % removed |
|---|---|---|---|---|---|
| Phenol | 10.2 | 0.9 | 91.2 | 4.6 | 54.9 |
| CN$^-$ | 5.4 | 0.7 | 87.0 | 0.4 | 92.6 |
| Fe | 210 | 1.11 | 99.5 | 36.1 | 82.8 |
| Cu | 630 | 1.05 | 99.8 | 0.53 | 99.9 |
| Pb | 1.6 | 0.40 | 75.0 | 0.12 | 92.5 |
| As | 0.47 | 0.13 | 72.3 | 0.14 | 70.2 |
| Cr | 24.4 | 0.19 | 99.2 | 3.09 | 87.3 |
| Cd | 1.46 | 0.04 | 97.3 | 0.34 | 76.7 |
| Ca | 249 | 157 | 36.9 | 278 | — |
| Mg | 11.6 | 5.6 | 51.7 | 9.7 | 16.4 |
| K | 223 | 769 | — | 218 | — |
| Na | 549 | 270 | 50.8 | 174 | 68.3 |
| Ni | 1.19 | 0.05 | 95.8 | 0.71 | 40.3 |
| Cl$^-$ | 8 530 | 1 640 | 69.1 | 1 620 | 81.0 |
| F$^-$ | 29.8 | 0.5 | 98.3 | 2.9 | 90.3 |
| COD | 1 540 | 970 | 37.0 | 841 | 45.4 |
| COT | 616 | 363 | 41.1 | 316 | 48.7 |
| B | 1.1 | 0.8 | 27.3 | <0.03 | >97.3 |

EXAMPLE 2

Leaching water from sanitary refuse a) Laboratory tests

Filtration tests on a column according to the invention were successfully carried out in the laboratory for the treatment of leaching water. These tests were made with 2 leachings originating from 2 different sites, Ste-Cécile de Milton and Victoriaville. The results of these tests are presented in Table 2. Globally, a very good yield with respect to the removal of the matters in suspension, metals (such as Fe, Zn, Mg, Mn), and oils and greases has been observed. The filter is also efficient, for the reduction of chlorides, sulfates, of the biological oxygen demand 5 days (BOD$_5$) and the chemical oxygen demand (COD).

For one of these 2 tests, an increase of the concentration in calcium was observed which indicates a contribution of this element by the filter. Increases of the pH in both cases were observed.

TABLE 2

AVERAGE CONCENTRATIONS (in mg/L) AND PERCENTAGE OF REMOVAL OF THE POLLUTING LOAD OF TWO (2) LEACHINGS AFTER FILTRATION ON FILTER ACCORDING TO INVENTION

|  | Ste-Cecile de Milton | | | Victoriaville | | |
|---|---|---|---|---|---|---|
|  | Inlet | Outlet | % | Inlet | Outlet | % |
| Ca | 773 | 51.9 | 33 | 255 | 571 | — |
| Cd | 0.05 | 0.03 | 40 |  |  |  |
| Co | 0.7 | 0.04 | 94 | 0.06 |  |  |
| Cr | <0.05 | <0.05 | — | 0.22 | <0.05 | <77 |
| Cu | 0.53 | 0.21 | 60 | 0.11 |  |  |
| Fe | 288 | 0.74 | 99.7 | 64.2 | 0.34 | 99.5 |
| Na | 780 | 313 | 52 | — | — | — |
| Ni | 0.32 | 0.11 | 66 |  |  |  |
| Pb | 0.25 | 0.11 | 56 | 0.13 | 0.22 | — |
| Zn | 1.23 | 0.01 | 99 |  |  |  |
| K | 789 | 603 | 23 | 194 | 160 | 18 |
| Mg | 145 | 51 | 65 | 53.9 | 0.25 | 99.5 |
| Mn | 34.7 | 1.3 | 96 | 6.4 | 0.16 | 97.5 |
| SO$_4$ | 517 | 451 | 13 | 42 | — | — |
| Cl$^-$ | 259 | 139.4 | 46 | — | — | — |
| MES | 640 | 14 | 98 | — | — | — |
| MVS | 250 | 11 | 96 | — | — | — |
| Sol T | 10 900 | 8 150 | 25 | 3 100 | 2 250 | 27 |

TABLE 2-continued

AVERAGE CONCENTRATIONS (in mg/L) AND PERCENTAGE OF REMOVAL OF THE POLLUTING LOAD OF TWO (2) LEACHINGS AFTER FILTRATION ON FILTER ACCORDING TO INVENTION

| | Ste-Cecile de Milton | | | Victoriaville | | |
|---|---|---|---|---|---|---|
| | Inlet | Outlet | % | Inlet | Outlet | % |
| Soi T vol | 4 950 | 3 200 | 35 | 1 300 | 450 | 65 |
| H/G | 402 | 46 | 88 | — | — | — |
| N-NH₄ | 435 | 157 | 64 | 106 | 16.4 | 85 |
| Pt | 6.2 | 1.6 | 74 | — | — | — |
| BOD₅ | 7 841 | 4 727 | 40 | 2 094 | 61 | 97 |
| COD | 12 456 | 5 941 | 52 | 2 577 | 525 | 80 |
| pH | 6.36 | 8.51 | — | 6.81 | 12.3 | — | b) Field tests

Table 3 gives results obtained with a pilot plant at Ste-Cécile-de-Milton. The filtering bed has a surface of 400 m² and was made of gravel, sand (10 cm) and wood ash (30 cm).

TABLE 3

AVERAGE POLLUTING CONCENTRATION (in mg/L) OF POLLUTING LOAD - FILTRATION OF LEACHING ON FILTER ACCORDING TO INVENTION

| | Inlet | Outlet | % |
|---|---|---|---|
| COD | 10 438 | 4 839 | 53.6 |
| COT | 3 467 | 1 522 | 56.1 |
| MES | 170 | 7 | 95.9 |
| Sulfure | 15.7 | 3.9 | 75.0 |
| Ca | 340 | 771 | — |
| Cr | 0.24 | <0.05 | >79.2 |
| Cu | 0.09 | 0.06 | 33.3 |
| Fe | 204 | 0.16 | 99.9 |
| Mg | 114 | 0.97 | 99.1 |
| Mn | 22.3 | <0.01 | >99.9 |
| Ni | 0.18 | 0.14 | 22.2 |
| Pb | 0.14 | <0.05 | >64.3 |
| Zn | 0.74 | 0.04 | 94.6 |
| pH | 6.13 | 12.03 | — |

In this case again, excellent results have been observed MES, metals (mainly Fe, Mg, Mn, Zn), a noticeable decrease of the COD and of all of the parameters except the pH and the concentration in calcium which increases. However, the value of these two parameters decreases during natural aeration. The $CO_2$ of air, by solubilizing in water, a slightly acid buffer and the calcium reacts with $CO_2$ to form insoluble $CaCO_3$.

EXAMPLE 3

Drained water from sites of mining residues

The water issued from mining residues sites are acid waters (pH=2.5) which present high metal concentrations. Filtration tests by the process according to the invention were carried out in the laboratory and in the field, on water derived from the mining residue sites of Solbec of Cambior Inc. in Stratford, Quebec.

a) Laboratory tests

These tests were made to confirm the flexibility of the process according to the invention. It has indeed been found that the thickness of the various filtrating media can be modified depending on the nature of the water under treatment. Bearing in mind the acid character of the mining water, it has been decided to reduce the thickness of the layer of peat (15 cm) with respect to that of wood ash (35 cm).

Table 4 gives the concentrations of the various parameters before and after filtration for each 10 liters of water filtrated.

The results given in Table 4 confirm the efficiency of the process and determine the upper limit of saturation of the filtration system, i.e. when the filtrating bed stops to hold polluting agents, and progressively flushes out the agents accumulated in the effluent. It has been observed that the pH of the effluent constitutes a good indicator of the point of saturation.

As shown in Table 4, the rates of removal of metals are excellent except for Pb.

When filtrating the first 50 liters, Cu, Fe, Mn and Zn are all removed at a rate higher than 99%.

After passing 80 liters, there is a pH decrease to 8.45 and an increase of the concentrations in Zn and Mn which suggests that the column has become saturated.

After 90 liters, the results show a flushing out of Cu and Ni. It can therefore be reasonably concluded that the point of saturation of the filter is at about pH=8.5.

Wood ash plays an essential role in the removal of metals since, by raising the pH of water, wood ash enables the formation of insoluble metallic hydroxides which are held at the surface of the particles of the filter.

In Table 5, the quantity adsorbed by the column is calculated for each metal. In total, 59258.5 mg of metals have been adsorbed by the column which contained 1.405 kg of filtrating materials. This corresponds to a rate of removal of metals of about 42 g/kg of filtrating material.

When the device reaches the saturation point, i.e. after filtrating 80 liters of mining water, 36.54 g have been adsorbed, which means that under the conditions of the tests, the saturation of a column was reached for a removal of 26 g/kg of filtrating material.

TABLE 4

CONCENTRATION OF PARAMETERS ANALYZED AT THE OUTLET OF THE FILTRATING COLUMN FOR MINING WATER

| Parameters (mg/l) | Affluent (drain)[1] | LITERS OF ACID WATER FILTRATED | | | | | | | | | | Average | % REMOVAL | |
|---|---|---|---|---|---|---|---|---|---|---|---|---|---|---|
| | | 10 | 20 | 30 | 40 | 50 | 60 | 70 | 80 | 90 | 100 | | 50 1 | 100 1 |
| pH | 2.50 | 11.20 | 10.90 | 10.55 | 9.45 | 9.90 | 9.00 | 8.90 | 8.45 | 7.95 | 6.85 | 8.40 | — | — |
| Alkalinity | 0 | — | 160 | — | 40 | 50 | 42 | 46 | 70 | — | 340 | 107 | — | — |
| Cond. | 5400 | — | 3560 | 2200 | 2000 | 3075 | 2900 | 3100 | 3000 | 4000 | 3000 | 2780 | — | — |
| MES | 7 | 2.8 | 1.5 | 0.4 | 2.3 | 2.5 | 4.3 | 1.4 | 2.7 | 2.4 | 2.17 | 2.25 | 73 | 69 |
| Cd | 0.86 | <0.02 | <0.02 | 0.04 | 0.04 | 0.05 | 0.05 | 0.06 | 0.04 | 0.06 | 0.07 | 0.04 | 96 | 95 |
| Cu | 36.2 | 0.05 | 0.07 | <0.02 | <0.02 | 0.09 | <0.02 | 0.11 | 0.17 | 0.10 | 5.87 | 0.05 | >99 | 98 |
| Fe | 620 | 0.28 | 0.10 | 0.05 | 0.08 | 0.05 | <0.01 | <0.03 | 0.05 | 0.13 | 0.09 | 0.09 | >99 | >99 |
| Mn | 35.9 | 0.05 | <0.02 | <0.02 | <0.02 | <0.02 | <0.02 | <0.02 | 0.03 | 133 | 219 | 35 | >99 | 3 |

TABLE 4-continued

CONCENTRATION OF PARAMETERS ANALYZED AT THE OUTLET
OF THE FILTRATING COLUMN FOR MINING WATER

| Parameters (mg/l) | Affluent (drain)[1] | LITERS OF ACID WATER FILTRATED | | | | | | | | | | Average | % REMOVAL | |
|---|---|---|---|---|---|---|---|---|---|---|---|---|---|---|
| | | 10 | 20 | 30 | 40 | 50 | 60 | 70 | 80 | 90 | 100 | | 50 l | 100 l |
| Ni | 1.31 | 0.08 | <0.02 | <0.04 | <0.04 | 0.05 | 0.05 | 0.05 | 0.05 | 2.08 | — | 0.27 | 96 | 80 |
| Pb | 0.25 | 0.36 | 0.15 | 0.15 | 0.19 | 0.27 | 0.26 | 0.26 | 0.29 | 0.32 | 0.36 | 0.26 | 22 | 0 |
| Zn | 180 | 0.06 | 0.05 | <0.02 | 0.05 | 0.04 | <0.02 | <0.02 | <0.03 | 2.26 | 188 | 21.5 | >99 | 88 |

[1]Based on 4 samples b) Field tests

A device according to the invention was arranged for the treatment of water from the Solbec mining site in Stratford, Quebec.

The tests were made in 2 phases during the fall of 1988. In total, a volume of 5975 m$^3$ was filtrated at a flow rate varying from 60 to 200 gal. imp./minute. The results obtained indicate that the process is very efficient. An increase of the pH to neutral or slightly basic values was observed, due to the alkaline wood ashes, and the rates of removal of the metals were excellent. Cu and Fe always show yields higher than 99%; the concentrations in the effluent for these two metals are well within the accepted norms.

The average rate of removal of Ni is 82% for the 2 periods and is well within the accepted norm. In the case of Zn, even though yields between 92.7% and 99.7% have been obtained, the effluent was mostly outside the accepted norms because of the high concentration of Zn in water. The rate of removal of Pb is generally good and enables to respect the accepted norms.

TABLE 5

QUANTITY OF METALS (in milligrams) ADSORBED BY THE COLUMN
FOR EACH 10 LITERS OF MINING WATER ADDED

| Number of liters passed through the column | mg of metals adsorbed by the column | | | | | | | total | Cumulative Total |
|---|---|---|---|---|---|---|---|---|---|
| | Cd | Cu | Fe | Mn | Ni | Pb | Zn | | |
| 10 | 4.56 | 70.54 | 3 978.7 | 166.3 | 7.8 | −1.0 | 1 179 | 5 406 | 5 406 |
| 20 | −0.3 | 47.7 | 743 | 3.8 | 1.6 | 2.5 | 145.5 | 973.8 | 6 379.8 |
| 30 | 3.6 | 270.8 | 2 849.5 | 183 | 3.8 | 0 | 799.8 | 4 110.5 | 10 490.3 |
| 40 | 3.6 | 270.8 | 2 849.2 | 182.9 | 3.8 | −0.4 | 799.5 | 4 109.4 | 14 599.7 |
| 50 | 3.5 | 270.1 | 2 849.5 | 182.8 | 3.7 | −1.2 | 799.6 | 4 108 | 18 707.7 |
| 60 | 8.8 | 519.8 | 6 129.9 | 414.9 | 13.3 | 1.3 | 1 829.8 | 8 917.8 | 27 625.5 |
| 70 | 8.7 | 518.9 | 6 129.7 | 414.8 | 13.4 | 1.3 | 1 830 | 8 916.8 | 36 542.3 |
| 80 | 9.2 | 553.3 | 6 609.5 | 473.7 | 15.1 | 1.3 | 1 829.7 | 9 491.8 | 46 034.1 |
| 90 | 9 | 554 | 6 608.7 | −856 | −5.2 | 1 | 1564 | 7 875.5 | 53 909.6 |
| 100 | 8.9 | 496.3 | 6 609.1 | −1 716 | — | 0.6 | −50 | 5 348.9 | 59 258.5 |
| TOTAL | 59.56 | 3 572.24 | 45 356.9 | −519.8 | 57.3 | 5.4 | 10 726.9 | 59 258.5 | |

TABLE 6

FILTRATION OF MINING WATER

| parameter (mg/l) | reject norm | 20-10 in/out (a) % removal (b) | 22-10 | 25-10 | 26-10 | 27-10 | 28-10 |
|---|---|---|---|---|---|---|---|
| pH | 6.5-9.5 | 4.1/11.1 (a) | —/9.32 | 41.6/9.14 | 3.98/10.52 | 3.82/9.24 | 4.08/8.88 |
| alkalinity | — | 10/233 | 0/140 | 14/144 | 13/452 | 10/120 | 12/100 |
| M.E.S. | 25 | — | — | — | — | — | — |
| Cu | 0.30 | 6.8/0.03 | 12.3/0.05 | 14.7/0.05 | 18.8/0.05 | 16.7/0.13 | 16.7/0.14 |
| | | 99.6% (b) | 99.6% | 99.7% | 99.7% | 99.2% | 99.2% |
| Fe | 3.00 | 19.2/0.15 | 88.1/0.24 | 111/0.29 | 123.2/0.75 | 113.9/1.12 | 114/0.51 |
| | | 99.2% | 99.7% | 99.7% | 99.4% | 99.0% | 99.6% |
| Ni | 0.50 | 0.44/0.07 | 0.7/0.09 | 0.73/0.14 | 0.9/0.11 | 0.89/0.06 | 0.86/0.16 |
| | | 84.1% | 87.1% | 80.8% | 87.8% | 93.3% | 81.4% |
| Pb | 0.20 | 1.2/0.26 | 0.97/0.08 | 0.47/0.23 | 0.88/0.30 | 0.84/0.31 | 0.72/0.26 |
| | | 78.3% | 91.8% | 51.1% | 65.9% | 63.1% | 63.9% |
| Zn | 0.50 | 53.4/0.05 | 91/2.51 | 109/8 | 123/1.85 | 124/2.39 | 126/4.99 |
| | | 99.9% | 97.2% | 92.7% | 98.5% | 98.1% | 96.0% |

EXAMPLE 4

Industrial waste water

Tests were made in the laboratory on highly polluted oil containing water, and the results show that the yields obtained are higher than 90% except for Ca, K, Na and Co (see Table 8). In spite of a high removal rate (97.0%), the concentration in oils and greases in the effluent was not exactly according to accepted norms since the water used was initially very highly polluted with polluting agents.

TABLE 7

FILTRATION OF MINING WATER

| parameter (mg/l) | reject norm | 03-11 in/out (a) % removal (b) | 04-11 | 07-11 | 08-11 | 09-11 | 10-11 |
|---|---|---|---|---|---|---|---|
| pH | 6.5-9.5 | 4.44/8.99 | 3.87/8.53 | 3.80/8.31 | 3.73/7.73 | 3.67/7.59 | 3.7/7.65 |
| alkalinity | — | 19/130 | 8.70 | 4.80 | 2.75 | 0/86 | 0.90 |
| M.E.S. | 25 | — | — | — | — | — | — |
| Cu | 0.30 | 13.8/0.06 | 15.5/0.06 | 16.2/0.03 | 15.1/0.04 | 15.1/0.05 | 15.1/0.07 |
|  |  | 99.6% | 99.6% | 99.8% | 99.7% | 99.7% | 99.5% |
| Fe | 3.00 | 86.3/1.50 | 91.4/0.2 | 82.1/0.11 | 81.3/0.13 | 75.2/0.15 | 73.8/0.14 |
|  |  | 98.3% | 99.8% | 99.9% | 99.8% | 99.8% | 99.8% |
| Ni | 0.50 | 0.85/0.1 | 0.91/0.09 | 0.88/0.10 | 0.87/0.20 | 0.87/0.35 | 0.89/0.31 |
|  |  | 88.2% | 90.1% | 88.6% | 77.0% | 59.8% | 65.2% |
| Pb | 0.20 | 0.58/0.31 | 0.85/0.23 | 0.92/0.29 | 0.95/0.30 | 0.90/0.31 | 0.95/0.25 |
|  |  | 46.6% | 72.9% | 68.5% | 68.4% | 65.6% | 73.7% |
| Zn | 0.50 | 103/2.89 | 115/2.51 | 111/4.33 | 121/11.9 | 1.06/21.1 | 109/22.4 |
|  |  | 97.2% | 97.8% | 96.1% | 90.2% | 80.1% | 79.4% |

TABLE 8

YIELD OF FILTER ACCORDING TO INVENTION IN TREATMENT OF OIL CONTAINING WATER

|  | At[1] Inlet | Local Norms | FB2[2] | % | FB3[3] | % | % tot[4] |
|---|---|---|---|---|---|---|---|
| H/G | 23 478 | 30 | 1 545 | 93.4 | 701 | 54.6 | 97.0 |
| Ca | 228 |  | 28 | <0 | 580 | <0 | <0 |
| Cd | 0.44 | 2 | 0.04 | 90.1 | 0.04 | 0 | 90.1 |
| Co | 0.40 |  | 0.10 | 75 | 0.10 | 0 | 75 |
| Cr | 6.18 | 5 | 0.53 | 91.4 | 0.41 | 22.6 | 93.4 |
| Cu | 89 | 5 | 3.54 | 96.0 | 1.2 | 66.1 | 98.7 |
| Fe | 311 |  | 10.3 | 96.7 | 3.81 | 63.0 | 98.8 |
| K | 878 |  | 845 | 3.8 | 148.1 | 82.3 | 86.1 |
| Mg | 157.2 |  | 4.0 | 97.5 | 0.52 | 87 | 99.7 |
| Mn | 15.4 |  | 0.14 | 99.1 | 0.0 | 100 | 100 |
| Na | 681 |  | 632 | 7.2 | 447 | 29.3 | 34.4 |
| Ni | 2.02 | 5 | 0.30 | 85.1 | 0.16 | 46.7 | 92.1 |
| Pb | 8.15 | 2 | 0.52 | 93.6 | 0.64 | — | 92.1 |
| Zn | 1.75 | 10 | 0.06 | 96.6 | 0.03 | 50 | 98.3 |

1. in mg/l
2. at outlet of commercially known FB2 filter
3. at outlet of filter according to the invention from FB2 filter
4. percentage of total removal for the treatment chain

EXAMPLE 5

Septic tank sludge a) Laboratory tests

Septic tank sludges were passed through a prefilter (grid with 0.5 mm openings followed by a 100 mm Geotextile), then were treated in batches at the rate of 4 liters/per day on a filtrating column according to the invention, i.e. 20 cm/cm$^2$/d. The results are given in Tables 9 and 10.

Generally, the treatment of the various parameters by the column according to the invention is very efficient. The total phosphorus, sulfides and phenols are removed at the rate of 100%. The reduction of the total coliforms and of the faecal coliforms is higher than 99.9% for a final concentration of less than 10 coliforms/100l.

TABLE 9

AVERAGE CONCENTRATION* OF DIFFERENT PARAMETERS BEFORE AND AFTER FILTRATION OF SEPTIC TANK SLUDGES AND PERCENT REMOVAL

| Parameters | Affluent | Effluent | % Removal |
|---|---|---|---|
| Pt | 31.35 | 0 | 100 |
| Chlorides | 461.67 | 468.7 | <0 |
| Phenols | 5.52 | 0 | 100 |
| Total cyanides | 2.26 | 0.08 | 96.5 |
| Oils and greases | 38.2 | 9.15 | 76 |
| Sulfates | 25.7 | 242.5 | <0 |

TABLE 9-continued

AVERAGE CONCENTRATION* OF DIFFERENT PARAMETERS BEFORE AND AFTER FILTRATION OF SEPTIC TANK SLUDGES AND PERCENT REMOVAL

| Parameters | Affluent | Effluent | % Removal |
|---|---|---|---|
| Total sulfides (mg/l H$_2$S) | 9.64 | 0 | 100 |
| MES | 805.0 | 10.9 | 98.6 |
| Total coliforms (number/100 ml) | 22 500 000 | <10 | >99.9 |
| Faecal coliforms (number/100 ml) | 170 000 | <10 | >99.9 |
| COD | 1 468.3 | 66.1 | 95.5 |
| pH | 6.77 | 11.09 |  |
| Alkalinity | 1 006 | 385.7 | 61.7 |
| Conductivity (umhos/cm) | 1 653.3 | 1 600.1 | 3.2 |
| BOD$_5$ | 542 | 92.6 | 82.9 |

*in mg/l, unless indicated otherwise

TABLE 10

AVERAGE CONCENTRATION (mg/l) OF METALS BEFORE AND AFTER FILTRATION OF SEPTIC TANK SLUDGES AND PERCENT REMOVAL

| Metal | Affluent | Effluent | % Removal |
|---|---|---|---|
| As | 0.045 | 0.025 | 44.4 |
| Ca | 87.4 | 117.15 | 0 |
| Cd | 0.01 | 0.01 | 0 |
| Cr | 0.06 | 0.06 | 0 |
| Cu | 1.12 | 0.14 | 87.5 |
| Fe | 13.06 | 0.13 | 99.0 |
| Mg | 10.53 | 0.28 | 97.3 |
| Mn | 2.69 | 0.04 | 98.5 |
| Ni | 0.08 | 0.04 | 50.0 |
| Pb | 0.04 | 0.01 | 75.0 |
| Zn | 0.165 | 0.02 | 87.9 |

It will be observed that there is a 96.5% reduction of total cyanides, i.e. 2.2 mg/l at 0.8 mg/l. The concentration of oils and greases decreases from 38.2 mg/l at the inlet to 9.15 mg/l at the outlet (75% removal).

There are no norms for the reject of effluents of septic tank sludges treated, but if reference is made to the reject norms for the leaching water of sanitary refuse sites, it will be seen that at the outlet of the column, the concentrations of all the parameters mentioned in the preceding paragraphs fall well below these norms.

The COD and BOD$_5$ have been reduced by 95.5% and 82.9% respectively. The reduction of MES is excellent, i.e. 98.6%.

Certain parameters have increased at the oulet of the column. The chlorides have increased from 461.67 to 468.7 mg/l, and the sufates from 25.7 to 242.5 mg/l. It would appear that the filtrating media of the column contribute to the increase of the sulfates and chlorides in the effluent. However, the concentration of these parameters in the effluent never exceeds the value of 1500 mg/l which is prescribed in the norms for leaching water.

Table 9 shows that the pH of the effluent from the column has an average of 11.09, as compared to that of the septic tank sludges which is 6.77. An aeration of the effluent during 24 hours has shown to be sufficient to decrease the pH from 11 to 6.7 which means that the problem of a high pH can easily be corrected by aeration. On the other hand, the high pH of the effluent contributes to an excellent reduction of the number of coliform bacteria.

Generally, the removal of the metals by the process according to the invention was excellent. It can be seen from Table 10 that the concentrations of As, Cu, Fe, Mg, Mn, Ni, Pb and Zn have decreased substantially.

The concentrations of Cr and Cd have not decreased, however, they were well below 0.1 mg/l even before filtration.

After filtration, there is an increase of the concentration of calcium in the effluent. It would seem that calcium has been flushed out by the filtrating media constituting the column. In particular, wood ash contains a large quantity of calcium.

b) Field tests

A device according to the invention was used for the treatment of septic tank sludges in Magog, Quebec, the filter having the same characteristics as the columns which were used in the laboratory.

Table 11 gives the values obtained before and after passing the sludge through a filter according to the invention.

The rate of removal was higher than 90% with respect to COD, phosphorus, MES, cyanides, phenols and most of the metals. The concentrations in nickel and chromium were less significantly reduced in terms of percent removal; however, the initial and final values are very low.

The yields obtained during the field tests are better than those observed in laboratory and confirm the efficiency of the process for the treating of septic tank sludges.

TABLE 11

SEPTIC TANK SLUDGE BEFORE AND AFTER TREATMENT WITH FILTER ACCORDING TO THE INVENTION

ANALYTICAL RESULTS

|  | Crude 10-05-88 | Effluent 11-05-88 | Effluent 12-05-88 | % average |
|---|---|---|---|---|
| pH | 7.11 | 11.03 | 11.03 | — |
| Alkalinity (mg CaCO3/l) | 2600 | 260 | 360 | 88.1 |
| Conductivity (umhos/cm) | 2600 | 1060 | 1450 | 51.7 |
| Sulfate | — | 35.5 | 35.5 | — |
| Chloride | 560 | 27.2 | 974 | — |
| BOD5 | 3900 | 1921 | — | 50.7 |
| COD | 383 | <10 | <10 | 97.4 |
| Total phosphorus | 44 | 0 | 0 | 100.0 |
| Nitrate | — | 0.06 | — | — |
| Materials in suspension | 1000 | 50 | 1 | 97.5 |

TABLE 11-continued

SEPTIC TANK SLUDGE BEFORE AND AFTER TREATMENT WITH FILTER ACCORDING TO THE INVENTION

ANALYTICAL RESULTS

|  | Crude 10-05-88 | Effluent 11-05-88 | Effluent 12-05-88 | % average |
|---|---|---|---|---|
| (MES) | — | — | — | — |
| Oils and greases | 50 | — | — | — |
| Sulfides | 24 | — | — | — |
| Cyanides | 6.2 | <0.1 | — | 98.4 |
| Phenol | 5.52 | 0 | — | 100.0 |
| Calcium | 110.6 | 36.2 | 105 | 36.2 |
| Cadmium | <0.02 | <0.02 | <0.02 | — |
| Cobalt | <0.02 | <0.02 | <0.02 | — |
| Chrome | 0.09 | 0.06 | 0.08 | 22.2 |
| Copper | 2.50 | 0.05 | 0.06 | 97.5 |
| Iron | 31.2 | 0.03 | 0.07 | 99.8 |
| Magnesium | 5.17 | 0.27 | 0.32 | 94.3 |
| Manganese | 9.90 | 0.19 | <0.01 | 99.0 |
| Nickel | 0.11 | <0.05 | <0.05 | >54.5 |
| Lead | <0.05 | <0.05 | <0.05 | — |
| Zinc | 0.36 | 0.02 | 0.03 | 93.1 |

EXAMPLE 6

Snow melting

The filter according to the invention was used for treating water resulting from the melting of snow. Tests were made in the laboratory on a column consisting essentially of wood ash, 21 cm high.

A total volume of 15 liters was filtrated at a rate of 100 ml/min and samples were taken after passing 2, 4, 6, 8, 10 and 15 liters.

It has again been observed that the filter according to the invention is efficient for the removal of metals even though the latter are present at low concentrations. The rate of removal of total Mg is 81% and for the other metals (Cu, Pb, Zn, Cr, Cd, Fe), the rate is higher than 96.9%. In particular, Pb goes from 4.47 mg/l to 0.01 mg/l, Zn from 5.46 mg/l to 0.17 mg/l and Fe from 205 mg/l to 0.23 mg/l. The results show an important reduction of COD.

It will be realised that wood ash which is an essential component of the filtering device according to the invention as well as the other materials used, such as peat, sand, gravel and Geotextile enable to remove a large amount of contaminants. The filters are specially efficient for the removal of metals with yields reaching up to 100%. Also, there is a substantial reduction of COD, MES, cyanides, oils and greases. Potassium, chlorides, sulfates and calcium are in certain cases only slightly removed and sometimes they are washed out in the effluent. This is explained by the polar nature of wood ash and the presence of large amounts of these elements therein.. The pH of the effluents after filtration is generally between 9 and 12 but can be brought back to neutral after natural aeration.

The pH appears to be a good indicator of the saturation of the filtrating bed. Normally, the saturation point is reached at pH of about 8.5.

We claim:

1. A device for filtering a liquid to remove impurities therefrom, said device having means to introduce said liquid therein, means defining a filtering medium and means to remove filtered liquid therefrom, wherein said filtering medium comprises a bed of wood ash, a bed of peat located upstream said bed of wood ash, a bed of gravel located upstream said bed of peat, a bed of sand located downstream said bed of wood ash and a bed of gravel located downstream said bed of sand, said filtering medium enabling said liquid to be allowed to flow therethrough so as to remove at least part of said impurities to give a purified liquid where said filtering medium contains sufficient wood ash to increase the pH of said purified liquid to between about 9 and 12.

2. Device according to claim 22 which comprises membrane means disposed between neighboring beds, said membrane means to prevent mixing of materials from said neighboring beds and to keep each bed in allocated place, while allowing said liquid to flow therethrough and through said beds.

3. Device according to claim 2, wherein said membrane means consists of a non-woven material made of synthetic fibres.

4. Device according to claim 1 wherein said bed of wood ash has a thickness up to about three times the thickness of any other bed.

5. Device according to claim 1 wherein the means to introduce said liquid in the device comprises a system for distributing said liquid at top of the uppermost bed substantially throughout the entire surface thereof, while allowing said liquid to flow by gravity through the entire filtering medium.

6. Device according to claim 1, wherein the means to introduce said liquid in the device comprises a system for distributing said liquid at top of the uppermost bed substantially throughout the entire surface thereof, while causing said liquid to flow under pressure through the entire filtering medium.

7. Device according to claim 1 which comprises means for introducing said liquid under pressure below the lowermost bed and forcing said liquid to flow upwardly through the entire filtering medium.

8. Method for filtering a liquid to remove impurities therefrom, which comprises causing said liquid to flow through a filtering medium comprising a bed of wood ash, a bed of peat located upstream said bed of wood ash, a bed of gravel located upstream said bed of peat, a bed of sand located downstream said bed of wood ash and a bed of gravel located downstream said bed of sand, said filtering medium enabling said liquid to be allowed to flow therethrough so as to remove at lest part of said impurities to give a purified liquid; recovering a filtered liquid substantially free from said impurities, wherein said filtering medium contains sufficient wood ash to increase the pH of said purified liquid to between about 9 and 12 and stopping filtration when the pH of the filtered liquid drops to about 8.5.

9. Method according to claim 8, which comprises distribution said liquid at top of the uppermost bed substantially throughout the entire surface thereof, and allowing said liquid to flow by gravity through the entire filtering medium.

10. Method according to claim 8, which comprises distributing said liquid at top of the uppermost bed substantially throughout the entire surface thereof which causing said liquid to flow under pressure through the entire filtering medium.

11. Method according to claims 8, which comprises introducing said liquid under pressure at bottom of the lowermost bed and forcing said liquid to flow through the entire filtering medium.

* * * * *